June 25, 1929.  B. H. ANIBAL  1,718,208
TORSION BALANCER
Filed April 2, 1928
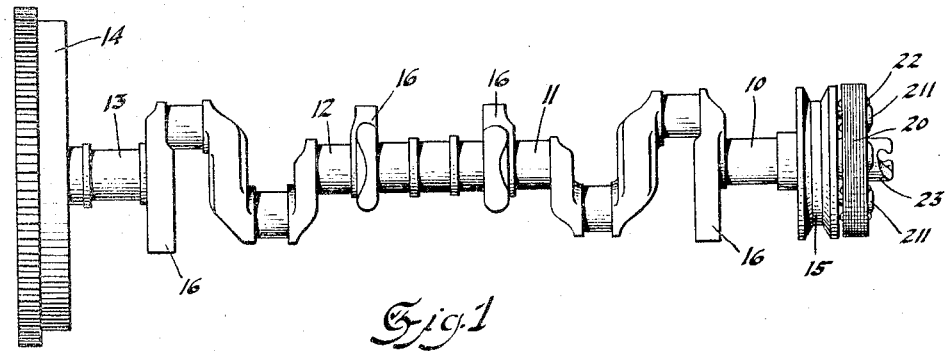
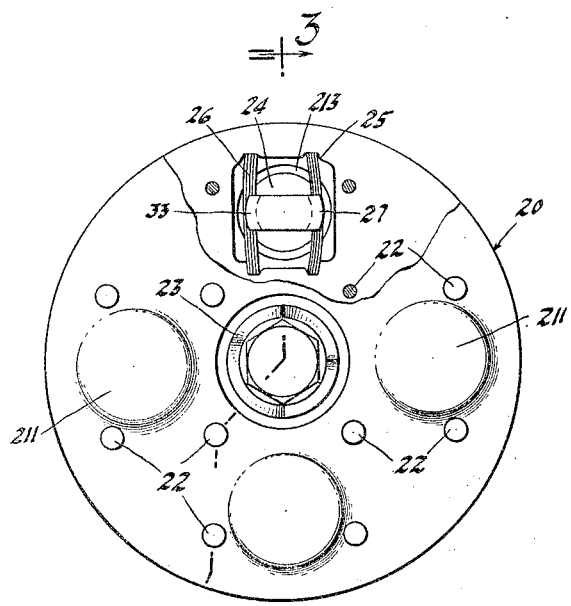
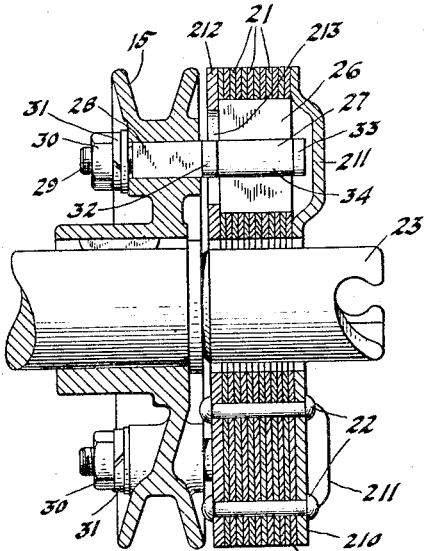
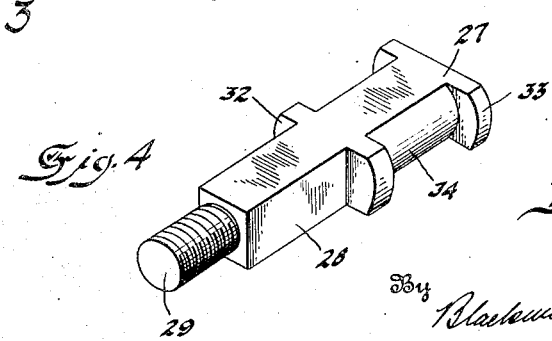
Inventor
Benjamin H. Anibal
By Blackmore, Spencer & Hush
Attorneys Patented June 25, 1929.

1,718,208

UNITED STATES PATENT OFFICE.

BENJAMIN H. ANIBAL, OF PONTIAC, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

TORSION BALANCER.

Application filed April 2, 1928. Serial No. 266,674.

This invention relates to means for minimizing torsional vibrations in shafts of engines or other machines.

When a shaft is elastic and has at one end a mass with a comparatively large moment of inertia, such as a flywheel, the shaft (with any attachments it may have) has a particular torsional frequency of its own. Any periodical variation of torque applied to the shaft in harmony with its frequency will set up torsional vibrations due to resonance. If these torsional vibrations are not curbed, disagreeable or serious results may occur owing to the violence of vibration during periods of resonance.

It is an object of this invention to minimize vibrations of a shaft, and to accomplish this by an attachment applicable to any form of shaft and requiring no modifications in the balance of the shaft.

This invention consists in the peculiar combination of a shaft with a torsion balancer comprising a mass balanced and having a moment of inertia about the axis of and elastically supported out of rubbing contact with the shaft and its fixtures by opposing leaf springs, to suppress the vibrations of the shaft at periods of resonance. The invention further consists in a torsion balancer comprising a mass built up of a plurality of thin assembled layers.

The invention also consists in the several combinations and elements more particularly described in the ensuing description, defined in the appended claims and illustrated in the accompanying drawings, in which, Fig. 1 is an elevation of an engine crank shaft having a flywheel fixed at one end and a balancer made in accordance with this invention at the other end;

Fig. 2 is an end view, looking from the front along the shaft axis, showing a torsion balancer made in accordance with this invention but with a fragment removed to disclose interior structure;

Fig. 3 is a sectional view on the line 3—3 of Fig. 2.

Fig. 4 is a detail of one of several spring abutment pins for sustaining the balancer.

In Fig. 1 there is illustrated a six throw crank shaft having four journals designated from front to rear by numerals 10, 11, 12 and 13. Fixed to the rear end is the usual flywheel 14. Suitable counterweights 16, effect dynamic balance. A fan pulley 15 is fixed to the front end of the shaft and in the illustrated embodiment the fan pulley serves also to support an elastically attached torsion balancing mass.

The fan pulley 15 may be considered as a disc, flange or other transverse fixture keyed to or otherwise made rigid with the crank shaft so that it must partake of all vibratory and other movements of the shaft. The balancer mass consists of a body 20, preferably laminated or composed of a number of thin plates 21, faced exteriorly with a plate 210, having embossed areas 211, and backed by a plate 212 having holes 213. The laminations may be fastened together in any convenient way, as by rivets 22. The construction of a balancing mass from thin plates in this manner facilitates manufacture, as the plates may be formed by a cutting die press, and the weight of the mass regulated by the number of plates assembled. Balancing masses of different weights may be produced by adding or removing one or more thin plates. Body 20 has an open center adapted to be passed over the shaft, or in the embodiment illustrated over the forward projecting hand starting clutch fixture 23. The opening in the body 20 is of greater diameter than the shaft or fixture 23 so that the body may be mounted free from rubbing contact. Spaced symmetrically, equidistantly from each other, are opposed spring abutments on the body. In the form shown there are two pairs of these abutments formed at the ends of opposing sides of radial cavities 24 spaced 90° apart. Shoulders 25 constitute the abutments or bearings for the ends of leaf springs 26 by which the balancer is elastically secured to the shaft, in this instance by spring connection with the rigid pulley 15. The springs are leaf springs, preferably composed of layers, each cavity 24 preferably containing a set of two opposing springs. Equal numbers of springs exert their pressure in opposite senses with respect to the axis of the body.

The spring abutments rigid with the shaft consist of studs 27, four in number in the embodiment shown, which are secured rigidly to a transverse member fixed to the shaft,—as illustrated, to the web of pulley 15. Each of the studs has a shank 28 fitting a perforation in the pulley web, preferably so that it cannot rotate, and a threaded end 29 to be engaged by a nut 30 and lock washer 31. A flange 32 serves to position each stud with respect to the pulley and to permit it to be tightened by screwing on the nut 30. A terminal flange 33 serves, in cooperation with flange 32, to retain the springs 26 and prevent them from being displaced edgewise when assembled. Rounded surfaces 34 on the studs between the flanges afford good bearings for the springs. For convenience in assembling the balancer, studs 27 between the flanges 32 and 33, and the flanges, are flattened upon opposite sides or otherwise shaped so that they are of lesser diameter in one diametrical plane containing the axis than in the plane at right angles to it. This formation allows the stud to be inserted freely between two opposed springs midway of their ends and then rotated 9° to tension the springs. The embossed areas 211 in the facing plate afford space for the flange 33 beyond or in front of the springs, and the holes 213 in the backing plate afford room for the insertion of the studs and the necessary vibration of the balancer. When the studs have been assembled with the balancer their shanks 28 may be pushed through the holes made for them in the pulley or other fixture and secured. After the assemblage is completed the balancing mass is free to vibrate with respect to the shaft and parts fixed to it, under the limitations imposed by the springs. The arrangement of leaf springs and abutment studs 27 equidistant from one another and separated 120° or less renders lateral displacement of the balancer impossible, and retaining bearings unnecessary.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

What I claim is:

1. In means for controlling torsional vibrations, the combination with a torsionally elastic shaft, of a balancer comprising a mass balanced and having a moment of inertia about the axis of the said shaft, spring abutments on the mass, leaf springs bearing on said abutments and other spring abutments rigid with the shaft engaging said springs and supporting the balancing mass free of frictional engagement with the shaft or fixtures thereof.

2. Means as defined in claim 1 wherein oppositely acting springs are disposed at angles with respect to one another.

3. Means as defined in claim 1 in which the leaf springs are symmetrically disposed at 90° apart, equal numbers of springs exerting their pressure in opposite directions.

4. In means for controlling torsional vibrations, the combination with a torsionally elastic shaft, of a balancer comprising a mass balanced and having a moment of inertia about the axis of said shaft, and sets of opposed leaf springs disposed at angles with respect to one another, spring abutments for said springs on the balancing mass, and other spring abutments rigid with the shaft engaging between the springs of each set, said springs sustaining the mass out of bearing contact with the shaft and parts rigid therewith.

5. Means as defined in claim 4, in which the balancing mass is provided with radial spring receiving cavities disposed at angles with respect to one another, there being spring bearings in said cavities for the ends of the springs, and abutment studs rigid with the shaft, engaging between the springs of each set.

6. In means for controlling torsional vibrations the combination with a torsionally elastic shaft, of a balancer comprising a mass balanced and having a moment of inertia about the axis of said shaft, opposed pairs of bearings on said mass, pairs of leaf springs having their ends bearing on said bearings, the springs of each pair being spaced apart, and studs rigid with the shaft bearing between the springs of each pair, said pairs of springs being symmetrically spaced about the axis of the shaft.

7. In means for controlling torsional vibrations, a shaft, a balancer having opposed pairs of spring bearings, opposed springs having their ends bearing on the spring bearings, and a stud rigid with the shaft, disposed between the springs, said stud having spaced flanges between which the springs bear and an intermediate spring abutment portion of lesser diameter in one direction than in the direction at right angles thereto.

8. In means for controlling torsional vibrations, the combination of a shaft with a torsional balancer comprising a plurality of thin layers secured together.

In testimony whereof I affix my signature.

BENJAMIN H. ANIBAL.